US007821519B2

(12) United States Patent
Perego

(10) Patent No.: US 7,821,519 B2
(45) Date of Patent: Oct. 26, 2010

(54) SCALABLE UNIFIED MEMORY ARCHITECTURE

(75) Inventor: Richard E. Perego, San Jose, CA (US)

(73) Assignee: Rambus Inc., Los Altos, CA (US)

(*) Notice: Subject to any disclaimer, the term of this patent is extended or adjusted under 35 U.S.C. 154(b) by 0 days.

(21) Appl. No.: 11/058,051

(22) Filed: Feb. 15, 2005

(65) Prior Publication Data

US 2005/0146529 A1 Jul. 7, 2005

Related U.S. Application Data

(63) Continuation of application No. 09/858,836, filed on May 15, 2001, now Pat. No. 6,864,896.

(51) Int. Cl.
*G06F 15/167* (2006.01)
*G06F 13/14* (2006.01)
*G06F 15/80* (2006.01)

(52) U.S. Cl. ........................ 345/542; 345/519; 345/505

(58) Field of Classification Search ................. 345/542, 345/541, 530, 501, 502, 536, 543, 505, 519
See application file for complete search history.

(56) References Cited

U.S. PATENT DOCUMENTS 5,325,493 A 6/1994 Herrell et al.
5,712,664 A * 1/1998 Reddy ........................ 345/519
5,838,334 A * 11/1998 Dye ........................... 345/503
5,867,180 A 2/1999 Katayama et al.
5,933,195 A * 8/1999 Florencio ............... 375/240.15
6,073,150 A * 6/2000 Volkonsky .................. 708/201
6,104,417 A 8/2000 Nielsen et al.
6,208,273 B1 * 3/2001 Dye et al. ..................... 341/51
6,275,234 B1 * 8/2001 Iwaki ......................... 345/428
6,317,135 B1 * 11/2001 Reddy ........................ 345/519
6,473,086 B1 * 10/2002 Morein et al. ............... 345/505
6,476,816 B1 11/2002 Deming ...................... 345/502
6,657,632 B2 * 12/2003 Emmot et al. ............... 345/502
6,690,726 B1 2/2004 Yavits et al.
7,365,757 B1 * 4/2008 Callway et al. ............. 345/629

* cited by examiner

*Primary Examiner*—Joni Hsu
(74) *Attorney, Agent, or Firm*—Silicon Edge Law Group LLP; Arthur J. Behiel

(57) ABSTRACT

A memory architecture includes a memory controller coupled to multiple modules. Each module includes a computing engine coupled to a shared memory. Each computing engine is capable of receiving instructions from the memory controller and processing the received instructions. The shared memory is configured to store main memory data and graphical data. Certain computing engines are capable of processing graphical data. The memory controller may include a graphics controller that provides instructions to the computing engine. An interconnect on each module allows multiple modules to be coupled to the memory controller.

23 Claims, 7 Drawing Sheets

SCALABLE UNIFIED MEMORY ARCHITECTURE

RELATED APPLICATIONS

This application is a continuation of application Ser. No. 09/858,863, filed May 15, 2001, entitled "Scalable Unified Memory Architecture", and incorporated herein by reference. That application issued on Mar. 8, 2005, as U.S. Pat. No. 6,864,896.

TECHNICAL FIELD

The present invention relates to memory systems and, in particular, to scalable unified memory architecture systems that support parallel processing of data.

BACKGROUND

Various systems are available for storing data in memory devices and retrieving data from those memory devices. FIG. 1 illustrates a computer architecture 100 in which a discrete graphics controller supports a local graphics memory. Computer architecture 100 includes a central processing unit (CPU) 102 coupled to a memory controller 104. Memory controller 104 is coupled to a main memory 108, an I/O controller 106, and a graphics controller 110. The main memory is used to store program instructions which are executed by the CPU and data which are referenced during the execution of these programs. The graphics controller 110 is coupled to a discrete graphics memory 112. Graphics controller 110 receives video data through a video input 114 and transmits video data to other devices through a display interface 116.

The architecture of FIG. 1 includes two separate memories (main memory 108 and graphics memory 112), each controlled by a different controller (memory controller 104 and graphics controller 110, respectively). Typically, graphics memory 112 includes faster and more expensive memory devices, while main memory 108 has a larger storage capacity, but uses slower, less expensive memory devices.

Improvements in integrated circuit design and manufacturing technologies allow higher levels of integration, thereby allowing an increasing number of subsystems to be integrated into a single device. This increased integration reduces the total number of components in a system, such as a computer system. As subsystems with high memory performance requirements (such as graphics subsystems) are combined with the traditional main memory controller, the resulting architecture may provide a single high-performance main memory interface.

Another type of computer memory architecture is referred to as a unified memory architecture (UMA). In a UMA system, the graphics memory is statically or dynamically partitioned off from the main memory pool, thereby saving the cost associated with dedicated graphics memory. UMA systems often employ less total memory capacity than systems using discrete graphics memory to achieve similar levels of graphics performance. UMA systems typically realize additional cost savings due to the higher levels of integration between the memory controller and the graphics controller.

FIG. 2 illustrates another prior art memory system 200 that uses a unified memory architecture. A CPU/Memory Controller subsystem 202 includes a CPU 208 and a memory controller and a graphics controller combined into a single device 210. The subsystem 202 represents an increased level of integration as compared to the architecture of FIG. 1.

Subsystem 202 is coupled to a shared memory 204, which is used as both the main memory and the graphics memory. Subsystem 202 is also coupled to an I/O controller 206, a video input 212, and a display interface 214.

The memory controller/graphics controller 210 controls all memory access, both for data stored in the main memory portion of shared memory 204 and for data stored in the graphics memory portion of the shared memory. The shared memory 204 may be partitioned statically or dynamically. A static partition allocates a fixed portion of the shared memory 204 as "main memory" and the remaining portion is the "graphics memory." A dynamic partition allows the allocation of shared memory 204 between main memory and graphics memory to change depending on the needs of the system. For example, if the graphics memory portion is full, and the graphics controller needs additional memory, the graphics memory portion may be expanded if a portion of the shared memory 204 is not currently in use or if the main memory allocation can be reduced.

Regardless of the system architecture, graphics rendering performance is often constrained by the memory bandwidth available to the graphics subsystem. In the system of FIG. 1, graphics controller 110 interfaces to a dedicated graphics memory 112. Cost constraints for the graphics subsystem generally dictate that a limited capacity of dedicated graphics memory 112 must be used. This limited amount of memory, in turn, dictates a maximum number of memory devices that can be supported. In such a memory system, the maximum graphics memory bandwidth is the product of the number of memory devices and the bandwidth of each memory device. Device-level cost constraints and technology limitations typically set the maximum memory device bandwidth. Consequently, graphics memory bandwidth, and therefore graphics performance, are generally bound by the small number of devices that can reasonably be supported in this type of system configuration.

Unified memory architectures such as that shown in FIG. 2, help alleviate cost constraints as described above, and generally provide lower cost relative to systems such as that shown in FIG. 1. However, memory bandwidth for the system of FIG. 2 is generally bound by cost constraints on the memory controller/graphics controller 210. Peak memory bandwidth for this system is the product of the number of conductors on the memory data interface and the communication bandwidth per conductor. The communication bandwidth per conductor is often limited by the choice of memory technology and the topology of the main memory interconnect. The number of conductors that can be used is generally bound by cost constraints on the memory controller/graphics controller package or system board design. However, the system of FIG. 2 allows theoretical aggregate bandwidth to and from the memory devices to scale linearly with system memory capacity, which is typically much larger than the capacity of dedicated graphics memory. The problem is that this aggregate bandwidth cannot be exploited due to the limiting factors described above relating to bandwidth limitations at the memory controller/graphics controller.

A system architecture which could offer the cost savings advantages of a unified memory architecture, while providing scalability options to higher levels of aggregate memory bandwidth (and therefore graphics performance) relative to systems using dedicated graphics memory would be advantageous.

SUMMARY

The systems and methods described herein achieve these goals by supporting the capability of locating certain processing functions on the memory modules, while providing the capability of partitioning tasks among multiple parallel functional units or modules.

In one embodiment, an apparatus includes a memory controller coupled to one or more modules. Each installed module includes a computing engine coupled to a shared memory. The computing engine is configured to receive information from the memory controller. The shared memory includes storage for instructions or data, which includes a portion of the main memory for a central processing unit (CPU).

In another embodiment, the computing engine is a graphics rendering engine.

In a particular implementation of the system, the shared memory is configured to store main memory data and graphical data.

Another embodiment provides that the computing engine is coupled between the memory controller and the shared memory.

In a particular embodiment, the memory controller includes a graphics controller.

In a described implementation, one or more modules are coupled to a memory controller. Each installed module includes a computing engine and a shared memory coupled to the computing engine.

DETAILED DESCRIPTION

The architecture described herein provides one or more discrete memory modules coupled to a common memory controller. Each memory module includes a computing engine and a shared memory. Thus, the data processing tasks can be distributed among the various computing engines and the memory controller to allow parallel processing of different portions of the various processing tasks.

Various examples are provided herein for purposes of explanation. These examples include the processing of graphical data by one or more rendering engines on one or more memory modules. It will be understood that the systems described herein are not limited to processing graphical data. Instead, the systems described herein may be applied to process any type of data from any data source.

Figure 1:
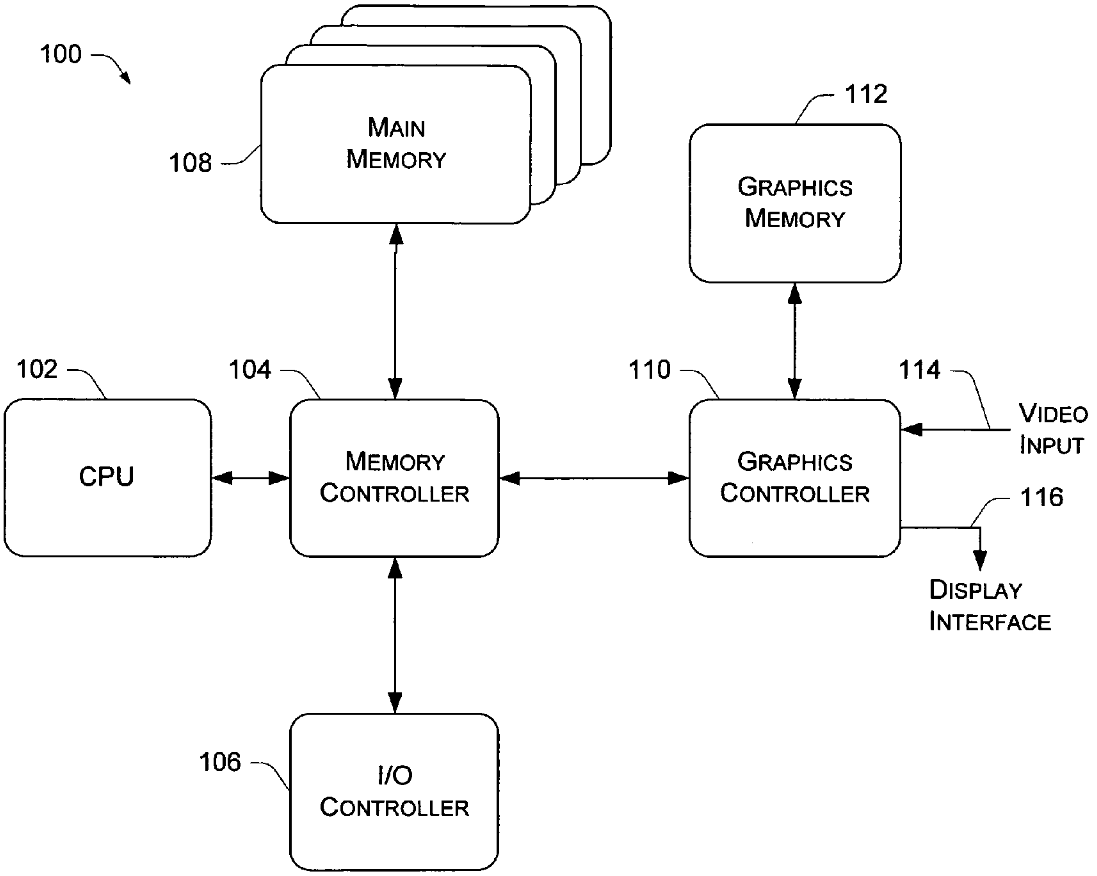
FIG. 1 illustrates a prior art computer architecture in which a discrete graphics controller supports a local graphics memory.
Figure 2:
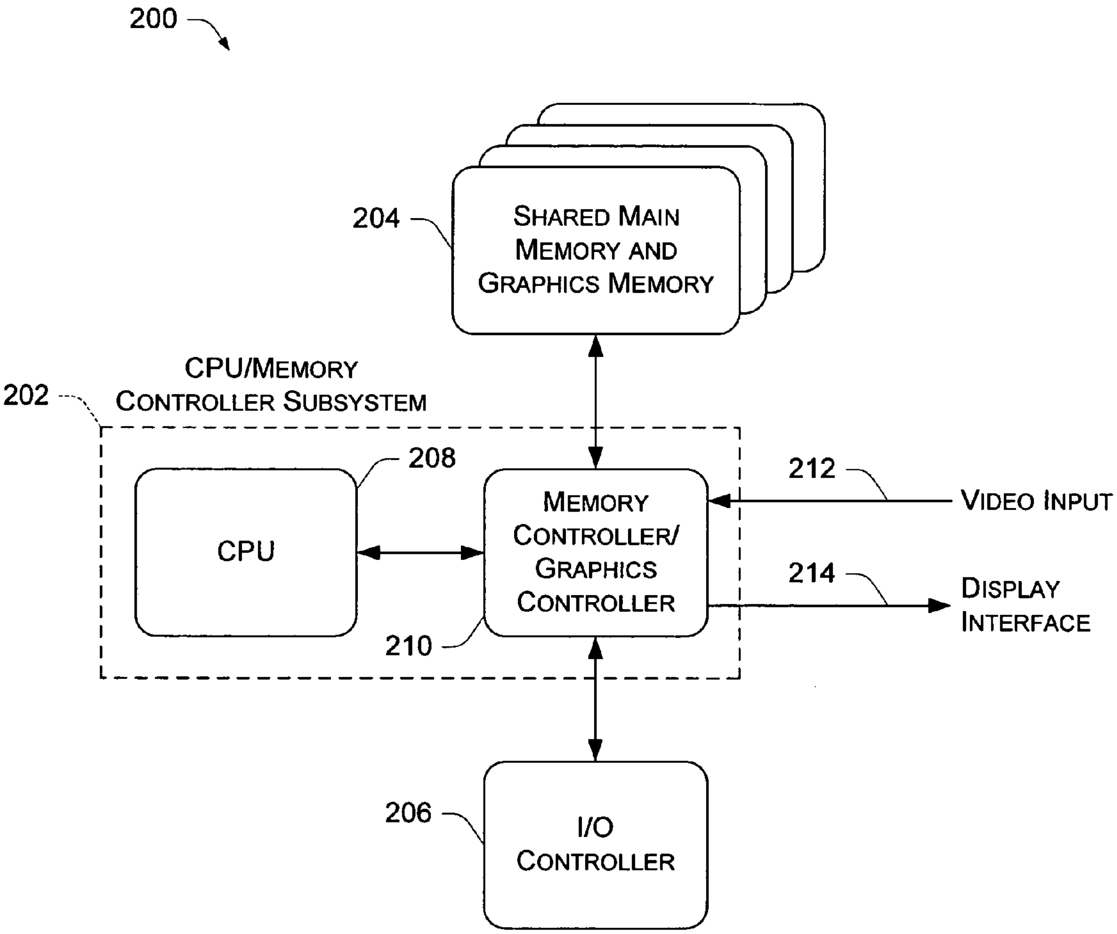
FIG. 2 illustrates another prior art memory system that uses a unified memory architecture.
Figure 3:
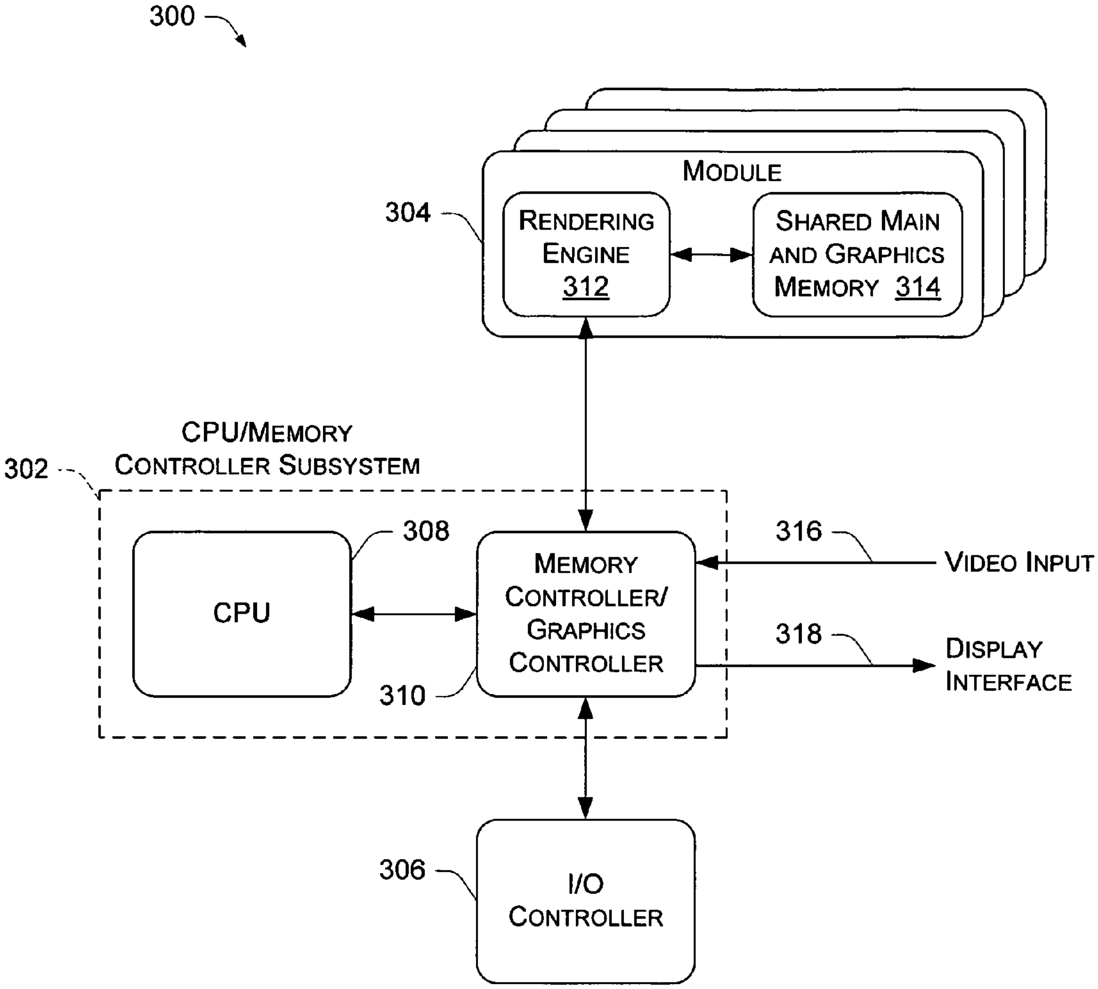
FIG. 3 illustrates an embodiment of a scalable unified memory architecture that supports parallel processing of graphical data.

FIG. 3 illustrates an embodiment of a scalable unified memory architecture 300 that supports parallel processing of graphical data and/or graphical instructions. A CPU/memory controller subsystem 302 includes a CPU 308 coupled to a memory controller/graphics controller 310. One or more memory modules 304 are coupled to memory controller/graphics controller 310 in subsystem 302. Each memory module 304 includes a rendering engine 312 and a shared memory 314 (i.e., main memory and graphics memory). The main memory typically contains instructions and/or data used by the CPU. The graphics memory typically contains instructions and/or data used to process, render, or otherwise handle graphical images or graphical information.

Rendering engine 312 may also be referred to as a "compute engine" or a "computing engine." The shared memory 314 typically includes multiple memory devices coupled together to form a block of storage space. Each rendering engine 312 is capable of performing various memory access and/or data processing functions. For the embodiment shown in FIG. 3, memory controller/graphics controller 310 is also coupled to an I/O controller 306 which controls the flow of data into and out of the system. An optional video input port 316 provides data to memory controller/graphics controller 310 and a display interface 318 provides data output to one or more devices (such as display devices or storage devices). For systems which support video input or capture capability, a video input port on the memory controller/graphics controller 310 is one way to handle the delivery of video source data. Another means of delivery of video input data to the system would include delivering the data from a peripheral module through the I/O controller 306 to device 310.

In the example of FIG. 3, CPU/memory controller subsystem 302 is coupled to four distinct memory modules 304. Each memory module includes a rendering engine and a shared memory. Each rendering engine 312 is capable of performing various data processing functions. Thus, the four rendering engines are capable of performing four different processing functions simultaneously (i.e., parallel processing). Further, each rendering engine 312 is capable of communicating with other rendering engines on other memory modules 304.

The memory controller/graphics controller 310 distributes particular processing tasks (such as graphical processing tasks) to the different rendering engines, and performs certain processing tasks itself. These tasks may include data to be processed and/or instructions to be processed. Although four memory modules 304 are shown in FIG. 3, alternate system may contain any number of memory modules coupled to a common memory controller/graphics controller 310. This ability to add and remove memory modules 304 provides an upgradeable and scalable memory and computing architecture.

The architecture of FIG. 3 allows the memory controller/graphics controller 310 to issue high level primitive commands to the various rendering engines 312, thereby reducing the volume or bandwidth of data that must be communicated between the controller 310 and the memory modules 304. Thus, the partitioning of memory among multiple memory modules 304 improves graphical data throughput relative to systems in which a single graphics controller performs all processing tasks and reduces bandwidth contention with the CPU. This bandwidth reduction occurs because the primitive commands typically contain significantly less data than the amount of data referenced when rendering the primitive.

Additionally, the system partitioning described allows aggregate bandwidth between the rendering engines and the memory devices to be much higher than the bandwidth between the controller and memory modules. Thus, effective system bandwidth is increased for processing graphics tasks.

Figure 4:
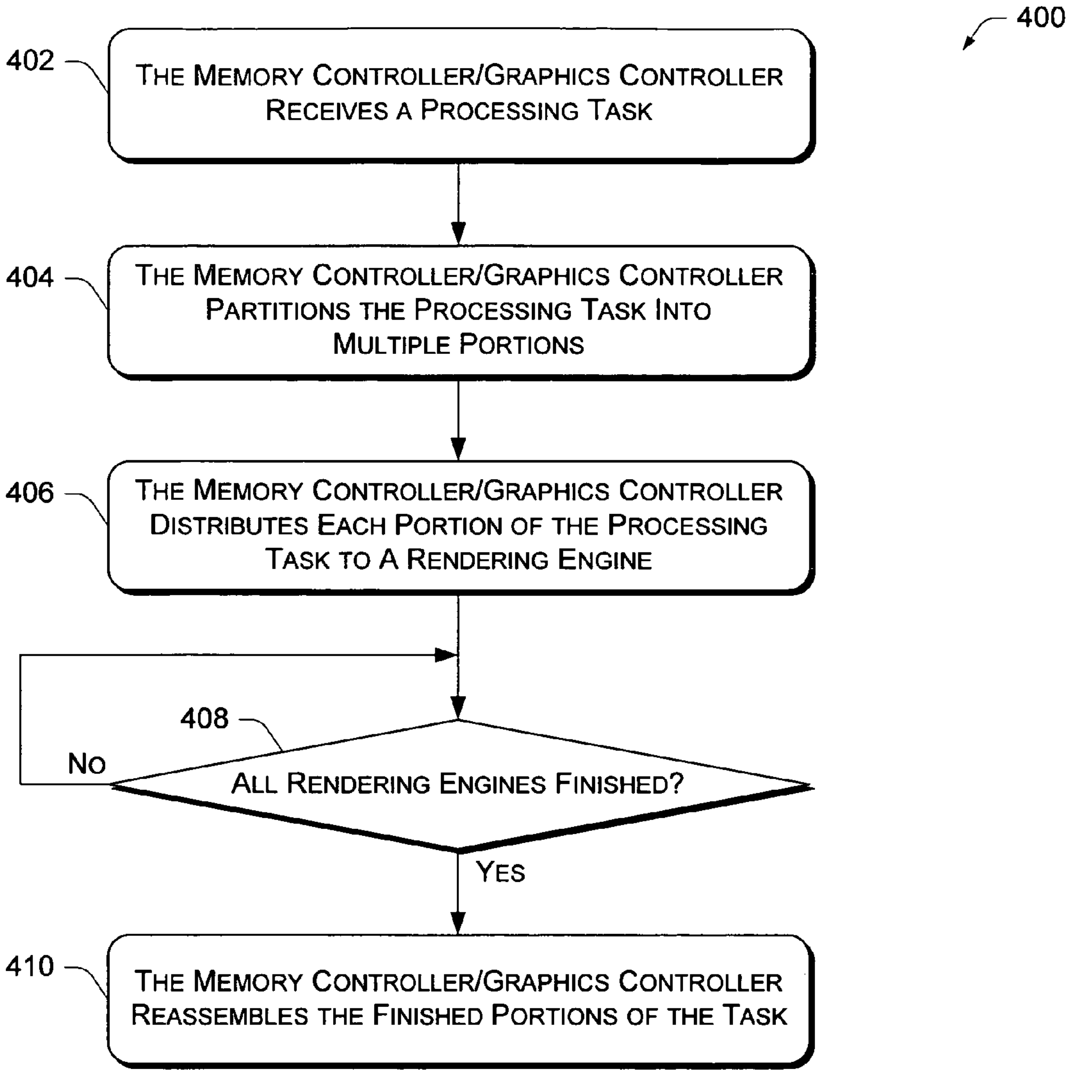
FIG. 4 is a flow diagram illustrating a procedure for partitioning a processing task into multiple portions and distributing the multiple portions to different rendering engines.

FIG. 4 is a flow diagram illustrating a procedure for partitioning a processing task into multiple portions and distributing the multiple portions to different rendering engines. Initially, the memory controller/graphics controller receives a processing task (block 402). The memory controller/graphics controller partitions the processing task into multiple portions (block 404) and distributes each portion of the processing task to a rendering engine on a memory module (block 406).

When all rendering engines have finished processing their portion of the processing task, the memory controller/graphics controller reassembles the finished portions of the task (block 410). In certain situations, the memory controller/graphics controller may perform certain portions of the processing task itself rather than distributing them to a rendering engine. In other situations, the processing task may be partitioned such that one or more rendering engines perform multiple portions of the processing task. In another embodiment, the processing task may be partitioned such that one or more rendering engines are idle (i.e., they do not perform any portion of the processing task).

For typical graphics applications, primitive data (e.g., triangles or polygons) are sorted by the graphics controller or CPU according to the spatial region of the rendering surface (e.g., the x and y coordinates) covered by that primitive. The rendering surface is generally divided into multiple rectangular regions of pixels (or picture elements), referred to as "tiles" or "chunks." Since the tiles generally do not overlap spatially, the rendering of the tiles can be partitioned among multiple rendering engines.

Figure 5:
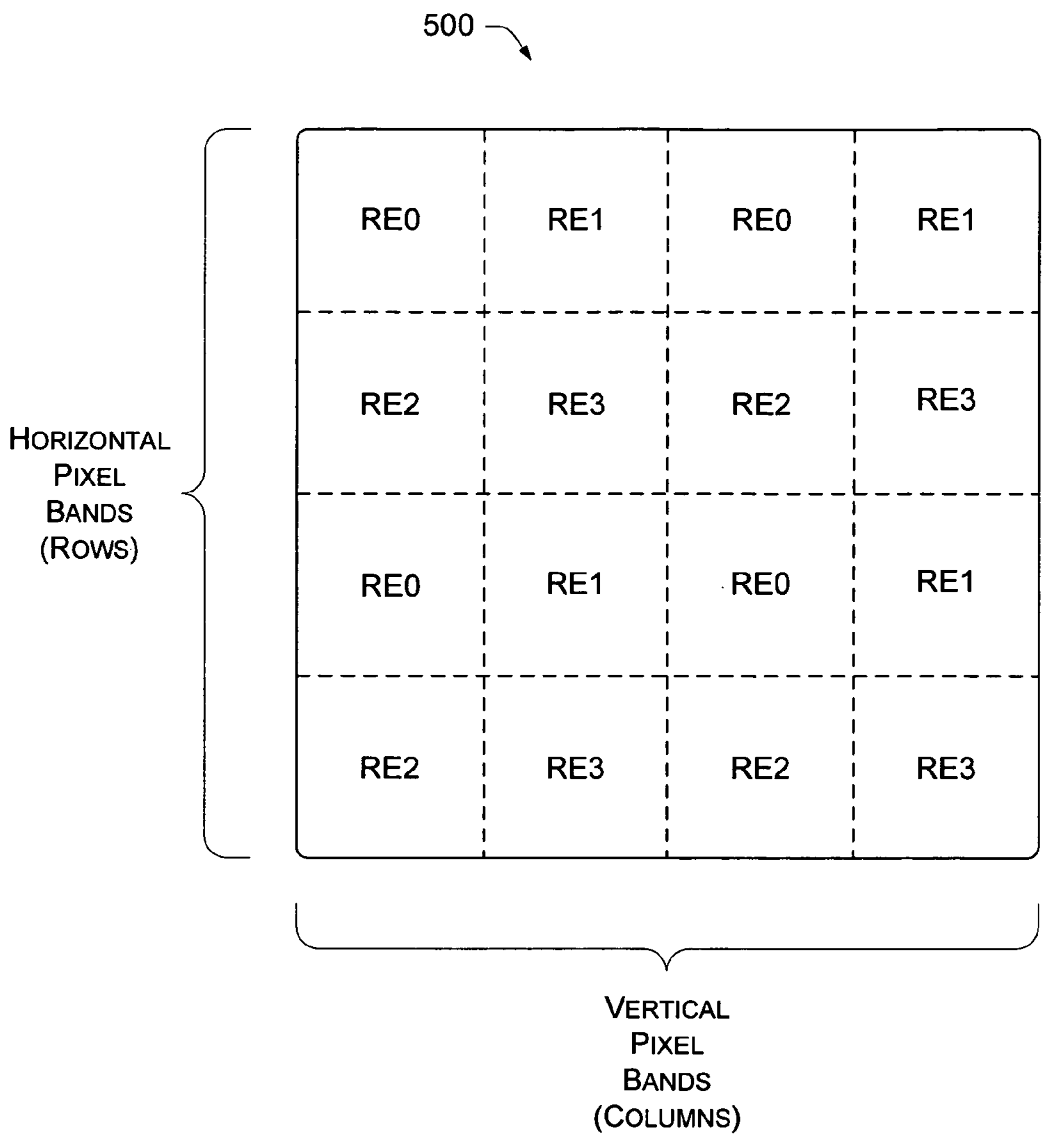
FIG. 5 illustrates a graphical rendering surface divided into sixteen different sections.

An example of the procedure described with respect to FIG. 4 will be described with reference to FIG. 5, which illustrates a graphical rendering surface divided into sixteen different sections or "tiles" (four rows and four columns). The graphical rendering surface may be stored in, for example, an image buffer or displayed on a display device. If a particular image processing task is to be performed on the graphical rendering surface shown in FIG. 5, the memory controller/graphics controller may divide the processing tasks into different portions based on the set of tiles intersected by the primitive elements of the task. For example, four of the sixteen tiles of the surface are assigned to a first rendering engine (labeled "RE0") on a first memory module. Another four tiles of the surface are assigned to a different rendering engine (labeled "RE1), and so on. This arrangement allows the four different rendering engines (RE0, RE1, RE2, and RE3) to process different regions of the surface simultaneously. This parallel processing significantly reduces the processing burden on the memory controller/graphics controller. In this example, a significant portion of the set of graphics rendering tasks is performed by the four rendering engines, which allows the memory controller/graphics controller to perform other tasks while these rendering tasks are being processed.

In an alternate embodiment, each of the rendering engines is assigned to process a particular set of rows or columns of the rendering surface, where these rows or columns represent a band of any size of pixels (at least one pixel wide). As shown in FIG. 5, the rendering surface is divided into two or more horizontal pixel bands (also referred to as pixel rows) and divided into two or more vertical pixel bands (also referred to as pixel columns). The specific example of FIG. 5 shows a rendering surface divided into four horizontal pixel bands and four vertical pixel bands. However, in alternate embodiments the rendering surface may be divided into any number of horizontal pixel bands and any number of vertical pixel bands. For example, the rendering surface may be divided into four sections or "quadrants" (i.e., two columns and two rows), in which each of the rendering engines is assigned to a particular quadrant of the rendering surface.

The example discussed above with respect to FIG. 5 is related to graphics or image processing. However, the system described herein may be applied to any type of processing in which one or more processing functions can be divided into multiple tasks that can be performed in parallel by multiple computing engines. Other examples include floating point numerical processing, digital signal processing, block transfers of data stored in memory, compression of data, decompression of data, and cache control. For example, a task such as decompression of a compressed MPEG (Moving Picture Experts Group) video stream can begin by partitioning the video stream into multiple regions or "blocks." Each block is decompressed individually and the results of all block decompressions are combined to form a complete video image. In this example, each block is associated with a particular rendering engine.

Figure 6:
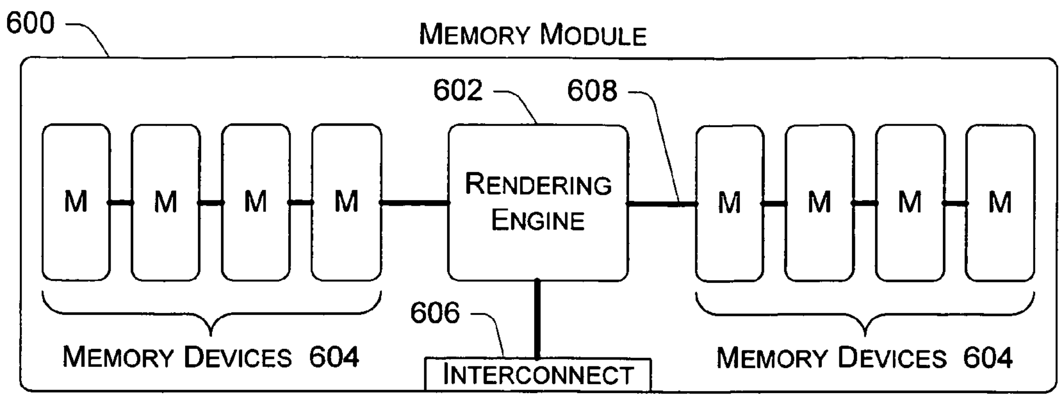
FIGS. 6 and 7 illustrate different memory modules containing a rendering engine and multiple memory devices.
Figure 7:
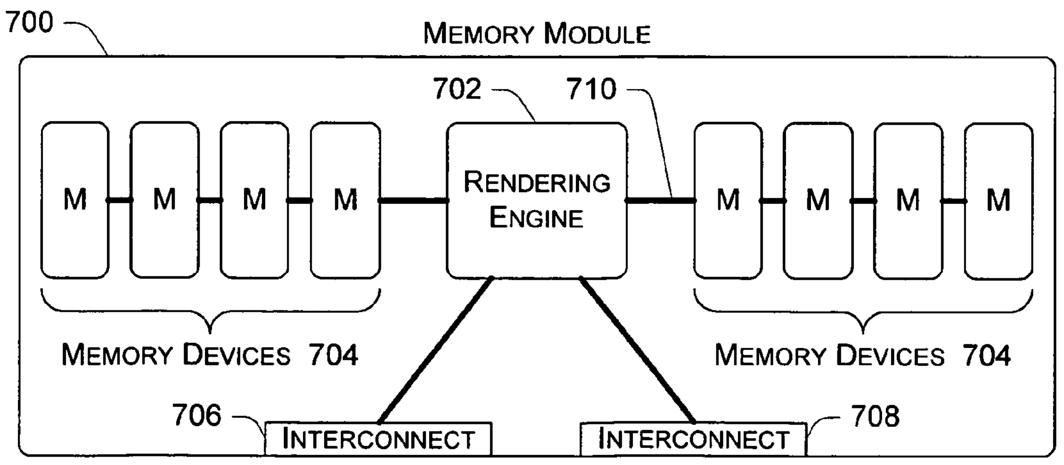

FIGS. 6 and 7 illustrate different memory modules containing a rendering engine and multiple memory devices. The multiple memory devices represent the shared memory 314 shown in FIG. 3. Although the memory modules shown in FIGS. 6 and 7 each contain eight memory devices, alternate memory modules may contain any number of memory devices coupled to a rendering engine.

Referring to FIG. 6, a memory module 600 includes eight memory devices 604 coupled to a rendering engine 602. The rendering engine 602 is also coupled to a module interconnect 606 which couples the memory module 600 to an associated interconnect on another module, motherboard, device, or other system. A memory interconnect 608 couples the memory devices 604 to the rendering engine 602. The memory interconnect 608 may allow parallel access to multiple memory devices 604, and may use either a multi-drop topology, point-to-point topology, or any combination of these topologies.

Referring to FIG. 7, a memory module 700 includes multiple memory devices 704 coupled to a rendering engine 702. The rendering engine 702 is also coupled to a pair of module interconnects 706 and 708, which couple the memory module 700 to another module, motherboard, device, or system. A memory interconnect 710 couples the memory devices 704 to the rendering engine 702 and may allow parallel access to multiple memory devices 704. In an alternate embodiment, module interconnects 706 and 708 are connected to form a contiguous interconnect through the module 700 connecting the rendering engine 702 to other devices in the system.

As discussed above, each memory module has its own memory interconnect for communicating data between the memory module's rendering engine and the various memory devices. The memory interconnect on each memory module is relatively short and provides significant bandwidth for communicating with the multiple memory devices on the module. Further, the simultaneous processing and communication of data on each memory module reduces the volume or bandwidth of data communicated between the memory modules and the memory controller/graphics controller. The memory interconnects discussed herein may be a bus, a series of point-to-point links, or any combination of these types of interconnects.

Figure 8:
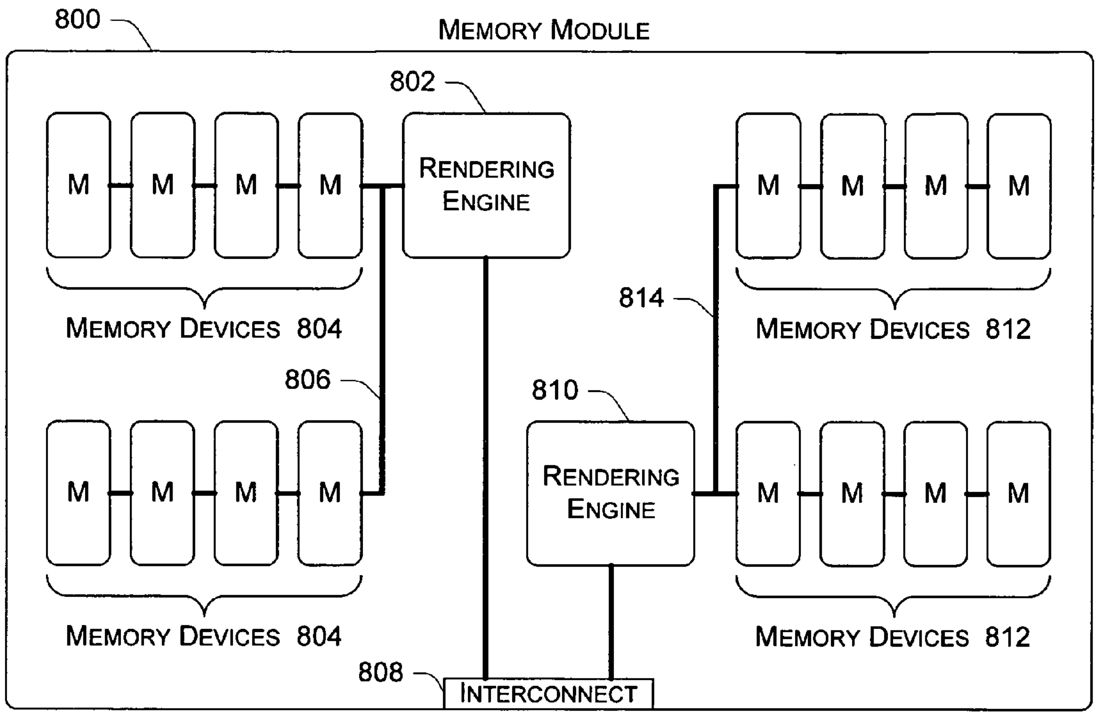
FIG. 8 illustrates a memory module containing two different rendering engines and multiple memory devices associated with reach rendering engine.

FIG. 8 illustrates a memory module 800 containing two different rendering engines 802 and 810, and multiple memory devices 804 and 812 associated with each rendering engine. In this embodiment, two different memory interconnects 806 and 814 couple the memory devices to the rendering engines. The two rendering engines 802 and 810 are coupled to a common module interconnect 808. Thus, rendering engines 802 and 810 can process data and/or tasks simultaneously. In another embodiment, each rendering engine 802 and 810 is coupled to an independent module interconnect (not shown).

A particular embodiment of the memory modules shown in FIGS. 6, 7, and uses multiple "Direct Rambus Channels" developed by Rambus Inc. of Mountain View, Calif. The Direct Rambus Channels connect the multiple memory devices to the associated rendering engine. In this embodiment, the memory devices are Rambus DRAMs (or RDRAMS®). However, other memory types and topologies may also be used within the scope of this invention. For example, memory types such as Synchronous DRAMs (SDRAMs), Double-Data-Rate (DDR) SDRAMs, Fast-Cycle (FC) SDRAMs, or derivatives of these memory types may also be used. These devices may be arranged in a single rank of devices or multiple ranks, where a rank is defined as a group of devices which respond to a particular class of commands including reads and writes.

In a particular embodiment of the architecture shown in FIG. 3, processing functions that are associated with typical graphics controller interface functions such as video input processing and display output processing are handled by the memory controller/graphics controller 310. Processing functions that are associated with high-bandwidth rendering or image buffer creation are handled by the rendering engines 304 on the memory modules.

Although particular examples are discussed herein as having one or two rendering engines, alternate implementations may include any number of rendering engines or computing engines on a particular module. Further, a particular module may contain any number of memory devices coupled to any number of rendering engines and/or computing engines.

Thus, a system has been described that provides multiple discrete memory modules coupled to a common memory controller. Each memory module includes a computing engine and a shared memory. A data processing task from the memory controller can be partitioned among the different computing engines to allow parallel processing of the various portions of the processing task.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A system comprising:

a central processing unit (CPU) to execute instructions;

a controller coupled to the CPU;

a first memory module coupled to the CPU via the controller, the first memory module including:

a first integrated circuit device, coupled to the controller, to process first graphical data that corresponds to a region of pixels for a video display; and a first plurality of integrated circuit memory devices coupled to the first integrated circuit device, the first plurality of integrated circuit memory devices to store a first subset of the instructions executed by the CPU and the first graphical data processed by the first integrated circuit device; and a second memory module coupled to the CPU via the controller, the second memory module including:

a second integrated circuit device, coupled to the controller, to process second graphical data for the video display; and a second plurality of integrated circuit memory devices coupled to the second integrated circuit device, the second plurality of integrated circuit memory devices to store a second subset of the instructions executed by the CPU and the second graphical data processed by the second integrated circuit device.

2. The system of claim 1 wherein:

the first integrated circuit device processes the first graphical data by rendering; and the second integrated circuit device processes the second graphical data by rendering.

3. The system of claim 1 wherein:

the first graphical data is a first portion of a motion pictures expert group video stream, wherein the first integrated circuit device processes the first graphical data by decompressing the first graphical data; and the second graphical data is a second portion of the motion pictures expert group video stream, wherein the second integrated circuit device processes the second graphical data by decompressing the second graphical data.

4. The system of claim 1, further including:

a first interconnect coupled to the first memory module and the controller; and a second interconnect coupled to the first memory module and the second memory module.

5. The system of claim 1, further including:

a first interconnect coupled to the first memory module and the controller; and a second interconnect coupled to the second memory module and the controller.

6. The system of claim 1 wherein the first plurality of memory devices and the second plurality of memory devices are double data rate synchronous DRAM devices.

7. The system of claim 1, further including:

a third memory module coupled to the controller, the third memory module including:

a third integrated circuit device, coupled to the controller, to process third graphical data that corresponds to a second region of pixels for the video display;

a third plurality of integrated circuit memory devices coupled to the third integrated circuit device, the third plurality of integrated circuit memory devices to store some of the instructions executed by the CPU and the third graphical data processed by the third integrated circuit device; and a fourth memory module coupled to the controller, the fourth memory module including:

a fourth integrated circuit device, coupled to the controller, to process a fourth graphical data for the video display;

a fourth plurality of integrated circuit memory devices coupled to the fourth integrated circuit device, the fourth plurality of integrated circuit memory devices to store some of the instructions executed by the CPU and the fourth graphical data processed by the fourth integrated circuit device.

8. The system of claim 1, wherein the controller is a memory controller and a graphics controller.

9. The system of claim 1, wherein the first and second integrated circuit devices simultaneously process the respective first and second graphical data.

10. The system of claim 1, wherein the controller partitions the first graphical data and the second graphical data from third graphical data that corresponds to the video display.

11. The system of claim 1, further including a port, disposed on the controller, the port to transfer video data with the controller.

12. A system comprising:

a central processing unit (CPU) to execute instructions;

a controller coupled to the CPU;

a first interconnect coupled to the controller and to the CPU via the controller;

a first memory module including:

a first integrated circuit device coupled to the controller via the first interconnect, the first integrated circuit device to perform floating point numerical processing on first numerical data and to decompress first graphical data; and a first plurality of integrated circuit memory devices coupled to the first integrated circuit device, the first plurality of integrated circuit memory devices to store at least some of the instructions executed by the CPU and the first graphical data decompressed by the first integrated circuit device;

a second interconnect coupled to the first integrated circuit device; and a second memory module including:

a second integrated circuit device coupled to the second interconnect, the second integrated circuit device to perform floating point numerical processing on second numerical data and to decompress second graphical data; and a second plurality of integrated circuit memory devices coupled to the second integrated circuit device.

13. The system of claim 12, wherein the first plurality of memory devices and the second plurality of memory devices are double data rate synchronous DRAM devices.

14. The system of claim 12, wherein the second plurality of integrated circuit memory devices are to store at least some of the instructions executed by the CPU and the second graphical data decompressed by the second integrated circuit device.

15. The system of claim 12, wherein the controller is a graphics controller and a memory controller.

16. A system comprising: a central processing unit (CPU) to execute instructions; a controller coupled to the CPU; a first memory module coupled to the controller and to the CPU via the controller, the first memory module including: a first integrated circuit device, coupled to the controller, to render a first block of pixel data corresponding to a graphical image; and a first plurality of integrated circuit memory devices coupled to the first integrated circuit device, the first plurality of integrated circuit memory devices to store a first subset of the instructions executed by the CPU and the first block of pixel data processed by the first integrated circuit device; and a second memory module coupled to the memory controller and to the CPU via the controller, the second memory module including: a second integrated circuit device, coupled to the controller, to render a second block of pixel data corresponding to the graphical image; and a second plurality of integrated circuit memory devices coupled to the second integrated circuit device, the second plurality of integrated circuit memory devices to store a second subset of the instructions executed by the CPU and the second block of pixel data processed by the second integrated circuit device.

17. The system of claim 16, further including:

a first interconnect coupled to the first memory module and the controller; and a second interconnect coupled to the first memory module and the second memory module.

18. The system of claim 16, further including:

a first interconnect coupled to the first memory module and the controller; and a second interconnect coupled to the second memory module and the controller.

19. The system of claim 16, wherein the first and the second plurality of memory devices are double data rate synchronous DRAM devices.

20. The system of claim 16, further including:

a third memory module coupled to the controller, the third memory module including:

a third integrated circuit device, coupled to the controller, to render a third block of pixel data corresponding to the graphical image; and a third integrated circuit memory device coupled to the third integrated circuit device; and a fourth memory module coupled to the controller, the fourth memory module including:

a fourth integrated circuit device, coupled to the controller, to render a fourth block of pixel data corresponding to the graphical image; and a fourth integrated circuit memory device coupled to the fourth integrated circuit device.

21. The system of claim 16, wherein the controller partitions the first block of pixel data from graphical data, and the controller partitions the second block of pixel data from the graphical data.

22. The system of claim 21, wherein the controller, after partitioning the first block of pixel data from the graphical data, distributes the first block of pixel data to the first integrated circuit device, and wherein the controller, after partitioning the second block of pixel data from the graphical data, distributes the second block of pixel data to the second integrated circuit device.

23. The system of claim 16, further including a port, disposed on the controller, the port to transfer video data with the controller.

* * * * *